United States Patent
Zenk et al.

(10) Patent No.: US 11,912,138 B2
(45) Date of Patent: Feb. 27, 2024

(54) METHOD AND DEVICE FOR BRAKING A TRAIN SET

(71) Applicant: Siemens Mobility GmbH, Munich (DE)

(72) Inventors: Ralph Zenk, Groebenzell (DE); Stefan Reinicke, Ilmmuenster (DE)

(73) Assignee: Siemens Mobility GmbH, Munich (DE)

( * ) Notice: Subject to any disclaimer, the term of this patent is extended or adjusted under 35 U.S.C. 154(b) by 775 days.

(21) Appl. No.: 17/052,929

(22) PCT Filed: Apr. 24, 2019

(86) PCT No.: PCT/EP2019/060520
§ 371 (c)(1),
(2) Date: Nov. 4, 2020

(87) PCT Pub. No.: WO2019/211142
PCT Pub. Date: Nov. 7, 2019

(65) Prior Publication Data
US 2021/0252984 A1 Aug. 19, 2021

(30) Foreign Application Priority Data
May 4, 2018 (DE) ...................... 10 2018 206 909.3

(51) Int. Cl.
*B60L 15/32* (2006.01)
*B60L 7/16* (2006.01)
(Continued)

(52) U.S. Cl.
CPC ................. *B60L 15/32* (2013.01); *B60L 7/16* (2013.01); *B60L 7/18* (2013.01); *B60L 7/24* (2013.01);
(Continued)

(58) Field of Classification Search
CPC ...... B60L 7/10; B60L 7/16; B60L 7/18; B60L 7/24; B60L 7/26; B60L 9/00; B60L 15/00;
(Continued)

(56) References Cited

U.S. PATENT DOCUMENTS 5,927,829 A * 7/1999 Saga ........................ B60T 8/448
180/165
9,592,810 B2 * 3/2017 Konishi ................ B60T 17/228
(Continued)

FOREIGN PATENT DOCUMENTS

CN 107487308 A * 12/2017 ................ B60L 7/26
CN 107487308 A 12/2017
(Continued)

OTHER PUBLICATIONS

BSL Cargo: "Bedienungshandbuch RE 485" [Operating Manual RE 485] (Oct. 10, 2007), Item 2.9 Multiple traction, pp. 2-15 to 2-17—English abstract.

*Primary Examiner* — Zachary L Kuhfuss
*Assistant Examiner* — Cheng Lin
(74) *Attorney, Agent, or Firm* — Laurence A. Greenberg; Werner H. Stemer; Ralph E. Locher

(57) ABSTRACT

A method for braking a train set having guiding and guided locomotives interconnected by a time multiplex train bus, includes detecting actual operating current of the guided locomotive, detecting actual operating current of the guiding locomotive, detecting maximum return current, detecting pneumatic braking request of compressed air brake line, determining maximum return current and target braking of the guided locomotive from actual operating current of the guided locomotive, actual operating current of the guiding locomotive, maximum operating current and pneumatic braking request of the brake line, and electrically braking the train set using electrical target braking, while not exceeding (Continued)

maximum return current of the guided locomotive. The maximum current fed back by the guided locomotive is known, and the guided locomotive controlled through the main air line is braked while not exceeding the maximum return current. The braking force is divided by blending among E and pneumatic brakes.

4 Claims, 3 Drawing Sheets

(51) Int. Cl.
*B60L 7/18* (2006.01)
*B60L 7/24* (2006.01)
*B60L 9/00* (2019.01)
*B60L 15/20* (2006.01)

(52) U.S. Cl.
CPC .............. *B60L 9/00* (2013.01); *B60L 15/2009* (2013.01); *B60L 2200/26* (2013.01)

(58) Field of Classification Search
CPC .. B60L 15/32; B60L 15/2009; B60L 2200/26; B60T 17/228
See application file for complete search history.

(56) References Cited

U.S. PATENT DOCUMENTS

| | | | | |
|---|---|---|---|---|
| 10,249,892 | B2* | 4/2019 | Lee | .......................... B60L 1/003 |
| 2010/0299036 | A1* | 11/2010 | Vespasien | ....... B60W 30/18109 |
| | | | | 701/70 |
| 2013/0341934 | A1* | 12/2013 | Kawanishi | .............. F03D 9/007 |
| | | | | 290/55 |

FOREIGN PATENT DOCUMENTS

| | | | | |
|---|---|---|---|---|
| DE | 4216586 A1 | | 11/1993 | |
| EP | 3069918 A1 | * | 9/2016 | |
| EP | 3069918 A1 | | 9/2016 | |
| JP | S6335103 A | * | 2/1988 | |
| JP | S6335103 A | | 2/1988 | |
| JP | 2015035933 A | * | 2/2015 | |
| JP | 2015035933 A | | 2/2015 | |
| JP | 2019040500 A | | 3/2019 | |
| RU | 2493028 C2 | | 9/2013 | |
| WO | WO-2016150658 A1 | * | 9/2016 | ............... H02H 3/40 |

* cited by examiner

FIG 2

| $I_{max}$ | $H_{LSollLG}$ | $E_{SollLG}$ | $I_{istLG}$ | $E_{Soll}$ | $H_{LSollLF}$ | $E_{SollLF}$ | $I_{istLF}$ |
|---|---|---|---|---|---|---|---|
| ≥400 A | 100 kN | 100 kN | 200 A | 100 % | 100 kN | 100 kN | 200 A |

FIG 3

| $I_{max}$ | $H_{LSollLG}$ | $P_{SollLG}$ / $E_{SollLG}$ | $I_{istLG}$ | $E_{Soll}$ | $H_{LSollLF}$ | $P_{SollLF}$ / $E_{SollLF}$ | $I_{istLF}$ |
|---|---|---|---|---|---|---|---|
| 300 A | 100 kN | 25 kN / 75 kN | 150 A | 75 % | 100 kN | 25 kN / 75 kN | 150 A |

METHOD AND DEVICE FOR BRAKING A TRAIN SET

BACKGROUND OF THE INVENTION

Field of the Invention

The invention relates to a method for braking a train set. The invention furthermore relates to a device for braking a train set, in particular a device for limiting a feedback current during the regenerative braking of a train set. The invention relates furthermore to a computer program product.

It is known that double or multiple traction of a train set is implemented in the ZDS/ZMS mode (time multiplex double traction control/time multiplex multiple traction control), which is also known as the TMC mode (time multiplex communication), wherein a maximum overcurrent limit value, predetermined per locomotive by a traction vehicle driver, per train bus cannot be transmitted from the guiding locomotive to the guided locomotive of the train set. There is thus disadvantageously no possibility of limiting the electrical feedback current of a guided locomotive when the latter carries out service braking electrically via the compressed air brake line using the regenerative brake.

If all of the locomotives in the train set, i.e. including the guided locomotives, individually set their target braking force values in accordance with the pressure reduction of the main air line, this may lead to the maximum network current upper limit being exceeded.

Overcurrent limit values for guided locomotives can be set via the network identification only depending on the electrical voltage system and country; individual specifications by the traction vehicle driver are not possible from the guiding locomotive.

An overcurrent regulation with individual specifications is possible only if the electrical brake (Ebrake) is used independently of the main air line, i.e. not in the event of a braking request via the main air line or compressed air brake line.

It would be conceivable for the overcurrent limit value to be able to be input per locomotive to the guided locomotive via the display. However, this requires great effort on the part of the traction vehicle driver who would in each case have to manually input said overcurrent limit value for the particular guided locomotive to all of the guided locomotives.

SUMMARY OF THE INVENTION

It is therefore an object of the present invention to provide an improved, in particular network-optimized, braking of a train set.

The object is achieved according to a first aspect by a method for braking a train set, wherein a guiding locomotive is connected to at least one guided locomotive by means of a time multiplex train bus system, the method having the following steps:
- detecting an actual electrical operating current of the guided locomotive;
- detecting an actual electrical operating current of the guiding locomotive;
- detecting a maximum return current value;
- detecting a pneumatic braking request value of the compressed air brake line;
- determining a maximum electrical return current and an electrical target braking value of the guided locomotive from the actual electrical operating current of the guided locomotive, the actual electrical operating current of the guiding locomotive, the maximum operating current value and the pneumatic braking request value of the compressed air brake line; and
- electrically braking the train set by means of the electrical target braking value in such a manner that the maximum electrical return current of the guided locomotive is not exceeded.

The electrical current fed back by the guided locomotive is thereby limited in such a manner that the electrical supply network is not overloaded. This is achieved by the fact that the electrical braking force is reduced as required and the missing braking force is instead applied pneumatically.

Thus, even in the case of inefficient train bus systems, limiting of the electrical feedback of the guided locomotive can advantageously be achieved.

According to a second aspect, the object is achieved by a device for braking a train set having a guiding locomotive and at least one guided locomotive, the device having:
- a time multiplex train bus system;
- an overcurrent limiting device on the guiding locomotive;
- a blending device on the guided locomotive;
- wherein the overcurrent limiting device can determine an electrical target braking value which can be transmitted from the overcurrent limiting device via the time multiplex train bus system to the blending device, wherein the guided locomotive of the train set can be braked electrically by means of the electrical target braking value in such a manner that a maximum value of the electrical current fed back by the guided locomotive is not exceeded.

Advantageous developments of the method are the subject matter of the respectively dependent claims.

One advantageous development of the method makes provision for a manually input maximum return current value to be detected. In this way, the traction vehicle driver can advantageously manually input the maximally permissible value of the feedback current (for example per track section), said value being read and processed by the method.

A further advantageous development of the method makes provision for a maximum return current value set to zero to be detected. Safe braking of the train set upon entry into a station region is thereby advantageously supported. Many railway operators generally require entry into terminus stations to be undertaken exclusively by means of pneumatic braking, and therefore the electrical braking is completely deactivated in this case.

A further advantageous development of the method makes provision for the actual electrical operating current of the guided locomotive and for the electrical target braking value to be transmitted via a TMC bus. A train bus which is limited in transmission capacity can thereby be used in order to inform the guided locomotive of the maximum current which can be fed back and thereby to carry out a suitable braking action without overloading the supply network.

The above-described properties, features and advantages of the invention and the manner in which these are achieved will become clearer and more clearly comprehensible in conjunction with the description below of the exemplary embodiments which will be explained in more detail in conjunction with two figures.

BRIEF DESCRIPTION OF THE SEVERAL VIEWS OF THE DRAWING

FIG. 2 shows a numerical example without intervention of the proposed overcurrent regulation.

FIG. 3 shows a numerical example with intervention of the proposed overcurrent regulation.

DETAILED DESCRIPTION OF THE INVENTION

Figure 1:
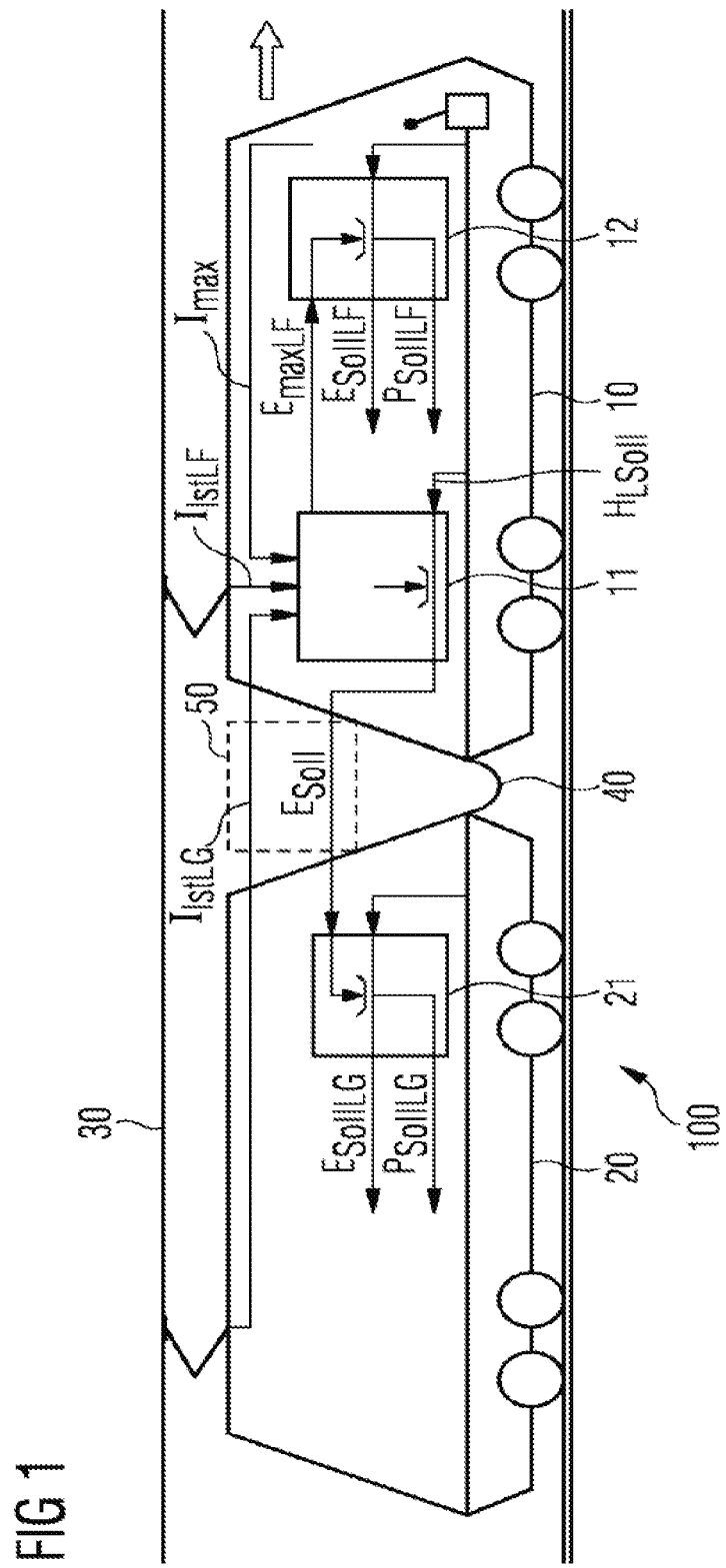
FIG. 1 shows an illustration of a train set having a guided locomotive and a guiding locomotive.

FIG. 1 shows, in greatly simplified form, a train set 100 having a guiding locomotive 10 and at least one guided locomotive 20. Although FIG. 1 only illustrates one individual guided locomotive 20, the proposed method can also be used for two or more guided locomotives 20. The proposed method will subsequently be explained in more detail for one individual guided locomotive 20. The guiding locomotive 10 is functionally connected to the guided locomotive 20 via a time multiplex train bus system 50 which has a limited transmission capacity due to a defined data width (e.g. 10 bytes), wherein said bytes are transmitted successively in the time multiplex mode.

The time multiplex train bus system 50 which is known per se can be implemented as a ZDS/ZMS bus which implements double traction (by means of the ZDS bus) or multiple traction (by means of the ZMS bus) of the locomotives 10, 20 of the train set 100. For example, the time multiplex train bus system 50 can be in the form of a TMC train bus. The time multiplex train bus system 50 thus has such a limited power and data transmission capability that an analogous value relating to an overcurrent which can be maximally fed back cannot be transmitted by the guiding locomotive 10 to the guided locomotive 20.

It is illustrated that the locomotives 10, 20 carry out a driving mode in double traction, as a result of which the train set 100 moves in a direction indicated by an arrow, wherein electrical power is obtained from an electrical overhead line 30, and wherein electrical current (feedback current) generated during the electrical braking is fed back into the overhead line 30. A compressed air brake line 40 (main air line HL) can furthermore be seen, via which the pneumatic braking requests for compressed air are transmitted from the guiding locomotive 10 to the guided locomotive 20.

On the guiding locomotive 10 there is an overcurrent limiting device 11 for limiting the fed back overcurrent, said overcurrent limiting device being functionally connected to a second blending device 21 of the guided locomotive 20 by means of a time multiplex train bus system 50. The overcurrent limiting device 11 is fed the following variables or signals: the current $I_{max}$ which can be maximally fed back and which can be input manually on a display of the guiding locomotive 10 by a traction vehicle driver, an actual current $I_{IstLF}$ of the guiding locomotive 10, an actual current $I_{IstLG}$ of the guided locomotive 20 and a pneumatic braking value $HL_{Soll}$.

A concept is proposed which permits the guided locomotive 20 to be informed about the overcurrent which can be maximally fed back by the guided locomotive 20 and permits electrical braking controlled by the main air line to be carried out in such a manner that said overcurrent which can be maximally fed back is not exceeded.

From said variables or signals, the overcurrent limiting device 11 generates an electrical target braking value $E_{Soll}$ of the electrical braking, which is transmitted via the time multiplex train bus system 50 to the second blending device 21 of the guided locomotive 20. In this manner, it is always known for the guided locomotive 20 which overcurrent value is maximally fed back into the overhead line 30 or may not be exceeded, wherein the braking power applied by the guided locomotive 20 during braking controlled by the main air line is implemented by an electrical target braking value $E_{SollLG}$ and a pneumatic target braking value $P_{SollLG}$.

The fact that the guided locomotive 20 is in each case electrically braked only to an extent such that the maximally permitted current which can be fed back is not exceeded, is thus advantageously supported.

For this purpose, the traction vehicle driver at respective track sections manually sets the size of the overcurrent permissible in each case of the track section on a display of the guiding locomotive 10.

During braking with the main air line 40, the guiding locomotive 10 sends an E target braking value, corresponding to the braking request, via the multiplex train bus system 50 to the guided locomotive 20, said E target braking value being reduced if required by the overcurrent regulation depending on the overcurrent actual values of the guided locomotive 20.

With the proposed solution, the guided locomotive 20 uses the supplied E target braking value $E_{Soll}$, in the event of a braking request via the main air line 40, as a threshold value for setting or dimensioning the electrical braking force. If the electrical braking force is insufficient for meeting the braking request $HL_{Soll}$ transmitted via the main air line 40, the missing braking force is generated at the guided locomotive 20 by the pneumatic blending brake which is controllable in an infinitely variable manner by means of the second blending device 21.

By means of an E target braking value $E_{Soll}$ of 0%, the use of the electrical brake in the event of a braking request via the main air line 40 can be deactivated throughout the entire train set 100. This is achieved by the fact that the value of the current $I_{max}$ which can be maximally fed back is set to zero by the traction vehicle driver, thus resulting in said electrical target braking value $E_{Soll}$ of 0%. This may be required, for example, in station regions if braking of the train set 100 with precise stopping of the train set 100 in relation to a buffer has to be carried out.

As a result, this advantageously relieves the traction vehicle driver of stress since he does not have to monitor a predetermined overcurrent limit value himself.

In the event of a braking request via the main air line 40, the guided locomotive 20 brakes regeneratively with the maximally permissible feedback current $I_{max}$. For the operator of the electrical network, this advantageously results in a saving of energy costs during operation of the train set 100 because the fed back current realizes a monetary benefit for the operator.

Only the braking force to be supplemented is generated pneumatically, thus advantageous reducing or minimizing wear of the pneumatic brake on the guided locomotive 20, which advantageously results in an extended service life of the pneumatic brake of the guided locomotive 20.

It is also seen in FIG. 1 that the overcurrent limiting device 11 generates an electrical braking value for the guiding locomotive 10, said braking value being converted by means of a first blending device 12 into an electrical target braking value $E_{SollLF}$ and into a pneumatic target braking value $P_{SollLF}$ of the guiding locomotive 10. The provision of said target braking values for the guiding locomotive 10 is known per se.

FIG. 2 shows a distribution of currents between the locomotives 10, 20 without intervention of the proposed overcurrent regulation. The non-activation of said intervention is caused by the limit value of the maximum current $I_{max} \geq 400$ A being of such a size that pneumatic braking power does not need to be produced on the guided locomotive 20. Said maximum current $I_{max}$ corresponds to overcurrents $I_{IstLF}$, $I_{IstLG}$ of the guiding and the guided locomotive 10, 20 of 200 A in each case.

Since, however, with this value, the maximally permitted overcurrent is not exceeded, in this case activation of the pneumatic braking is not carried out, and therefore the entire braking of the guided locomotive 20 is carried out to 100% by means of the electrical target braking value $E_{Soll}$, which corresponds to a braking force of the pneumatic braking request $HL_{SollLG}$ of the guided locomotive 20 of 100 kN which is completely converted (i.e. to 100%) into an electrical target braking value $E_{SollLG}$ of the guided locomotive 20 of 100 kN. Limiting of the fed back overcurrent is thus not required in this case. It is seen that the electrical target braking value $E_{Soll}$ can be used to 100% because, during the electrical braking of the guided locomotive 20, the maximum feedback current is not exceeded.

FIG. 3 shows a further numerically defined formation of currents of the locomotives 10, 20. In this case, because of the fact that the input maximum current $I_{max}$ of 300 A is smaller than in FIG. 2, provision of pneumatic braking on the guided locomotive 20 is activated. This leads to a pneumatic portion of the braking $P_{SollLG}$ of 25% being provided for the guided locomotive 20 so that the maximally permissible overcurrent of 300 A, which signifies a maximally permissible overcurrent $I_{IstLF}$ of 150 A for the guided locomotive 20, is not exceeded. In this way, the overcurrent limiting device 11 determines an electrical target braking value $E_{Soll}$ of 75% of the guided locomotive 20, said target braking value dividing up an overall braking force in accordance with the pneumatic braking request $HL_{SollLG}$ of 100 kN into a pneumatic braking force of 20 kN and into an electrical braking force of 75 kN.

Figure 4:
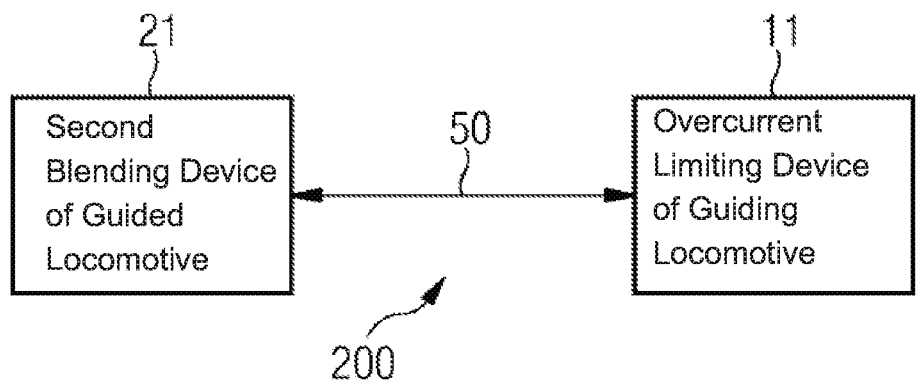
FIG. 4 shows a schematic block circuit diagram of a device for braking a train set.

FIG. 4 shows a greatly simplified block circuit diagram of a device 200 for braking a train set 100. It shows an overcurrent limiting device 11 of a guiding locomotive 10 (not illustrated) that is connected via a time multiplex train bus system 50 to a second blending device 11 of the guided locomotive 20 and that carries out the above-explained determination of the target braking value for the guided locomotive 20.

Figure 5:
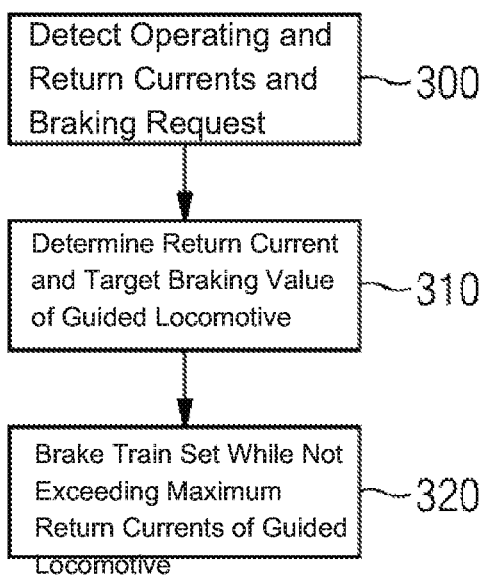
FIG. 5 shows a schematic diagram of a method for braking a train set.

FIG. 5 shows a schematic flow diagram of an embodiment of the method according to the invention for braking a train set 100.

In a step 300, detecting of an actual electrical operating current $I_{IstLG}$ of the guided locomotive 20, of an actual electrical operating current $I_{IstLF}$ of the guiding locomotive 10, of a maximum return current value $I_{max}$, and of a pneumatic braking request value $HL_{Soll}$ of the compressed air brake line 40 is carried out.

In a step 310, determining of a maximum electrical return current and of an electrical target braking value of the guided locomotive 20 from the actual electrical operating current $I_{IstLG}$ of the guided locomotive 20, from the actual electrical operating current $I_{IstLF}$ of the guiding locomotive 10, from the maximum operating current value $I_{max}$ and from the pneumatic braking request value $HL_{Soll}$ of the compressed air brake line 40 is carried out.

In a step 320, electrical braking of the train set 100 by means of the electrical target braking value $E_{Soll}$ is carried out in such a manner that the maximum electrical return current of the guided locomotive 20 is not exceeded.

The proposed method for operating a means of transport can advantageously be in the form of a software program which runs on the central vehicle controller of the guiding locomotive 10. Simple configurability and changeability of the method is thereby supported.

In summary, the present invention provides a method and a device with which an overcurrent limit value can be set on a guided locomotive, wherein the guided locomotive can normally make as much use as possible of the electrical brake without exceeding the corresponding overcurrent or feedback current limit.

Although the invention has been illustrated and described in detail by preferred exemplary embodiments, the invention is not restricted by the disclosed examples and other variations can be derived therefrom by a person skilled in the art without departing from the scope of protection of the invention.

LIST OF REFERENCE SIGNS

10 Guiding locomotive
11 Overcurrent limiting device
12 First blending device
20 Guided locomotive
21 Second blending device
30 Overhead line
40 Compressed air brake line
50 Time multiplex train bus system
100 Train set
200 Device
300 . . . 320 Method steps

The invention claimed is:

1. A method for braking a train set, the method comprising:
providing a guiding locomotive, at least one guided locomotive and a time multiplex train bus system interconnecting the guiding locomotive and the at least one guided locomotive;
detecting an actual electrical operating current of the guided locomotive;
detecting an actual electrical operating current of the guiding locomotive;
detecting a maximum return current value as a current to be maximally fed back;
detecting a pneumatic braking request value of a compressed air brake line;
determining a maximum electrical return current and an electrical target braking value of the guided locomotive from the actual electrical operating current of the guided locomotive, the actual electrical operating current of the guiding locomotive, the maximum return current value and the pneumatic braking request value of the compressed air brake line;
transmitting the electrical target braking value through the time multiplex train bus system to the guided locomotive; and
electrically braking the train set by using the electrical target braking value to prevent a maximum overcurrent of the guided locomotive to be fed back from being exceeded.

2. The method according to claim 1, which further comprises detecting a manually input maximum return current value.

3. The method according to claim 1, which further comprises detecting a maximum return current value set to zero.

4. The method according to claim 1, which further comprises transmitting the actual electrical operating current of the guided locomotive and the electrical target braking value though a TMC bus.

\* \* \* \* \*